United States Patent [19]
Bourkel et al.

[11] Patent Number: 5,873,561
[45] Date of Patent: Feb. 23, 1999

[54] TWO-PORT CARTRIDGE SEAT VALVE

[75] Inventors: Arséne Bourkel, Belvaux, Luxembourg; Bernd Lanfermann, Rees, Germany; Karl Tratberger, Duisburg, Germany; Karl-Heinz Post, Kaarst, Germany

[73] Assignee: Hydrolux S.A.R.L., Luxembourg, Luxembourg

[21] Appl. No.: 275,548

[22] Filed: Jul. 15, 1994

[30] Foreign Application Priority Data

Jul. 16, 1993 [LU] Luxembourg ............................ 88 384

[51] Int. Cl.$^6$ ........................ F16K 31/383; F16K 31/124
[52] U.S. Cl. ............................ 251/36; 251/44; 251/63.6; 137/489; 137/492.5
[58] Field of Search ........................... 251/63, 63.5, 63.6, 251/26, 30.01, 30.02, 43, 44, 34, 36, 48, 51; 137/488, 489, 492.5

[56] References Cited

U.S. PATENT DOCUMENTS

| | | | |
|---|---|---|---|
| 2,755,058 | 7/1956 | Margrave | 251/30.02 |
| 2,841,359 | 7/1958 | Berck | 251/63 |
| 2,882,922 | 4/1959 | Schindel | 251/43 |
| 3,101,924 | 8/1963 | Berck | 251/63 |
| 3,246,669 | 4/1966 | Adams | 137/489 |
| 3,260,275 | 7/1966 | Armstrong et al. | 251/63 |
| 3,315,696 | 4/1967 | Hunter | 251/63 |
| 3,373,763 | 3/1968 | Smilges et al. | 137/489 |
| 3,862,738 | 1/1975 | Stumpmeier | 251/26 |
| 3,913,885 | 10/1975 | Greenwood et al. | 251/63 |
| 4,340,086 | 7/1982 | Hemm et al. | 251/43 |
| 4,478,245 | 10/1984 | Bender | 251/30.01 |
| 4,494,726 | 1/1985 | Kumar et al. | 251/44 |
| 4,531,540 | 7/1985 | Meister | 137/489 |
| 4,535,966 | 8/1985 | Post et al. | 251/26 |
| 4,548,231 | 10/1985 | Schwede | 137/492.5 |
| 4,848,721 | 7/1989 | Chudakov | 251/30.02 |
| 4,865,074 | 9/1989 | Bickford et al. | 251/63.5 |
| 4,896,694 | 1/1990 | Rausch | 137/492.5 |
| 4,972,870 | 11/1990 | Changnian et al. | 137/488 |
| 5,404,902 | 4/1995 | Wen | 251/30.02 |

FOREIGN PATENT DOCUMENTS

| | | |
|---|---|---|
| 3619927 | 12/1987 | Germany . |
| 3741521 | 2/1989 | Germany . |
| 2202612 | 9/1988 | United Kingdom ................... 137/488 |

OTHER PUBLICATIONS

David C. Downs, "Cartridge Check Valves: New option for hydraulic control," *Machine Design,* vol. 52, No. 28, Dec. 1980, Cleveland, Ohio, pp. 143–147.

D.G. Feldmann, "Systematik des Aufbaus von Steuerungen mit 2–Wege–Einbauventilen," *Olhydraulik Und Pneumatik,* vol. 22, No. 6, Jun. 1978, Mainz, Germany, pp. 337–341.

B. Mougeot, "Distributeurs hydrauliques à clapet piloté à la fermeture," *Energie Fluide,* vol. 25, No. 2, Mar. 1986, Paris, France, pp. 41–44.

*Primary Examiner*—George L. Walton
*Attorney, Agent, or Firm*—Howrey & Simon; Michael J. Bell

[57] ABSTRACT

A two-port cartridge type seat valve has a valve sleeve with a stepped guide bore for a poppet. The poppet includes a piston flange that divides the second step of the guide bore axially into an end-face first pilot chamber and an annular second pilot chamber. A first connection channel through the valve sleeve connects the annular second pilot chamber with an annular chamber into which a lateral main flow port opens. The free cross-section of a valve seat and of an axial main flow bore correspond approximately to the cross-section of the first step of the guide bore.

15 Claims, 4 Drawing Sheets

TWO-PORT CARTRIDGE SEAT VALVE

BACKGROUND OF THE INVENTION

The invention relates to a two-port cartridge type seat valve.

For approximately thirty years, two-port cartridge valves have been widely used in hydraulic control technology as pressure-control, directional or check valves. Such cartridge valves are described in detail, for example, in the article "Cartridge check valves: New option for hydraulic control" by David C. Downs, in "Machine Design", Vol. 52, No. 28, of 11th Dec., 1980, Cleveland USA, pages 143–147. A positive-seating, two-port cartridge valve is likewise described in German Offenlegungsschrift DE-A-36 19 927.

Such two-port cartridge valves are used in a manifold that has a stepped bore and first and second main flow channels. The stepped bore has a first bore step that is connected to the first main flow channel and a second bore step, with a larger diameter than the first bore step, that is connected to the second main flow channel.

The typical two-port cartridge type seat valve includes a valve sleeve that is inserted into the stepped bore, a poppet fitted in the sleeve for sliding axial displacement, a closure spring that biases the poppet into sealing engagement with a valve seat in the valve sleeve, and a valve cover. The valve sleeve has first and second ends, with a first cross-sectional portion at the first end that sealingly fits axially into the first bore step, and a second cross-sectional portion that sealingly fits axially into the second bore step. A central cross-sectional portion between the first and second cross-sectional portion defines an annular chamber within the second bore step, into which the second main flow channel opens when the valve sleeve is inserted into the stepped bore. The sleeve also has an axial main flow bore that forms a first main port in the first end of the valve sleeve and lateral second main ports in the central cross-sectional portion for connecting the main flow bore with the annular chamber. The valve seat is disposed in the main flow bore between the first and said second main ports.

The poppet has first and second ends, with the first end having a closure cone that sealingly engages the valve seat in the valve sleeve. The poppet is biased closed by the closure spring.

To make the two-port cartridge valves interchangeable, the diameters and depths of the stepped bore, the position of the lateral second main flow channel in the manifold, and the dimensions of the valve cover and the position of its fastening screws and pilot connections, are set out in standards for the different nominal valve sizes. In Germany, for example, the relevant standard is DIN 24342. As a result, the external shape of the valve sleeve is substantially predetermined and the person skilled in the art has little scope for adapting the valve to different functions.

Known valves have a cylindrical guide bore that extends from the valve seat axially through the valve sleeve to the second end of the valve sleeve. The poppet is fitted in the guide bore for axial displacement in the valve sleeve. Within the guide bore, a pilot chamber is defined axially by the second end of the poppet. The second end of the poppet accordingly forms a pilot pressure area, $S_X$, equal to the cross-sectional area of the guide bore.

The maximum possible cross-section of the guide bore is dictated by the minimum necessary wall thickness of the valve sleeve in its central cross-sectional portion and the necessary free cross-section of the annular chamber in the region of the second main port. Accordingly, the maximum possible pilot area $S_X$, the maximum possible cross-section of the poppet, and therefore the maximum possible free cross-section $S_A$ of the valve seat are also fixed. The free cross-section $S_A$ of the valve seat must, of course, be smaller than the cross-section of the poppet's closure cone which, in turn, cannot be larger than the cross-section of the guide bore.

Such two-port cartridge valves with a maximum free cross-section $S_A$ for the valve seat are used as pressure-control valves. In this application the valves should have a maximum flow capacity. Therefore, the pilot area $S_X$ (which is fixed by the cross-section of the guide bore) is preferably approximately equal to the free cross-section $S_A$ of the valve seat.

However, two-port cartridge valves can also be used as pilot-controlled two/two-port directional valves for switching applications. For such applications, the maximum free cross-section SA of the valve seat is reduced by about 35% to 50%, to reduce the hydrostatic force acting on the poppet in the opening direction, rendering the switching behavior of the valve as much as possible independent of pressure fluctuations in the first main flow port. Consequently, the flow capacity of the valve is reduced by about 35% to 50%, or the valve produces a greater pressure loss. There is thus a need for a two-port cartridge valve that provides a switching function with a high flow capacity.

SUMMARY OF THE INVENTION

This need is met with by the two-port cartridge valve of the present invention, in which the valve sleeve has a stepped guide bore for the poppet, with a first step extending in the central cross-sectional portion from the valve seat towards the second end of the valve sleeve and preferably having a maximum possible cross-section in that portion, and a second step extending substantially within the second cross-sectional portion of the valve sleeve and having a cross-section larger than that of the first step. The valve poppet has at its second end a piston flange that divides the second step of the guide bore axially into an end-face first pilot chamber and an annular second pilot chamber. A first connection channel through the valve sleeve connects the annular second pilot chamber with the annular chamber. The free cross-sections of the valve seat and the axial main flow bore correspond approximately to the cross-section of the first step of the guide bore.

If the valve is used as a two/two-port directional valve for the hydraulically controlled blocking or release of hydraulic fluid flow between the first and second main flow ports, the second annular pilot chamber is subjected to the lower pressure $P_B$ in the second main flow channel, via the first connection channel and the annular chamber. If the first pilot chamber is then subjected to a pilot pressure $p_X$ (which corresponds approximately to the pressure $P_A$ in the first main flow channel) the larger cross-section of the first pilot chamber will produce a hydrostatic closing force that supplements the closing force of the closure spring.

The maximum cross-section of the second step of the guide bore is, of course, fixed by the minimum wall thickness of the valve sleeve in its second cross-sectional portion, which is sealingly fitted axially into the second bore step. In most cases the cross-section of the second step of the guide bore can be increased by about 100% relative to the first step of the guide bore.

The first step of the guide bore, which extends as far as the valve seat, has the maximum possible cross-section that can be accommodated in the central cross-sectional portion of the valve sleeve. That maximum possible cross-section is determined, on the one hand, by the minimum wall thickness of the valve sleeve in that region and, on the other hand, by the necessary free cross-section of the annular chamber. Since the free cross-sections of the valve seat and of the main flow bore correspond approximately to the cross-section of the first step of the guide bore, the valve has high flow capacity.

As a result of the additional hydrostatic closing force in the closed switching position, on one hand, and as a result of the low pressure losses in the open switching position, on the other hand, the valve is well suited to use as a pilot-controlled two/two-port directional valve for switching functions.

Optionally, the valve may have a throttle (flow restricting orifice) inserted in the first connection channel that influences the closing and opening movements of the poppet. In prior art valves, such a throttle is inserted into a pilot oil bore in the valve cover.

Another optional feature of the valve is a second connection channel that extends through the piston flange between the first and second pilot chambers. The valve may be used as a pilot-controlled pressure-control valve simply by closing the first connection channel. The net pilot pressure area acting in the closure direction corresponds approximately to the free cross-section of the valve seat. Further, a throttle may be inserted into the second connection channel, which in most cases will significantly improve the valve's dynamic behavior as a pressure-control valve. If the valve is to be used as a non-return valve, both the first and the second connection channels are left open, so that a higher pressure prevailing in the second main flow channel closes the valve.

As a further option, a third connection channel may be provided in the first end of the poppet extending from the end-face of the poppet into the second pilot chamber. By closing the second connection channel the valve can be opened by a higher pressure $P_B$ prevailing in the second main flow channel, against the lower pressure $P_A$ prevailing in the first main flow channel and the closing force of the closure spring.

Thus, there are many possible applications for which the valve can be used, of which only a few are specifically identified here. The valve can be adapted to these varied functions without expensive or labor-intensive alterations to the valve sleeve or to the poppet.

The piston flange on the second valve end also provides a significant structural advantage. If the poppet has an axial bore to provide a spring chamber for accommodating the closure spring, the wall thickness of the poppet in the region of the piston flange will be considerably greater than in the remainder of the poppet. Accordingly, a relatively deep annular groove can be provided in the piston flange for a sealing element, The sealing element may be, for example, an O-ring and a sliding ring, both of which are arranged in the annular groove. Such a sealing ring combination has excellent sealing properties and a long service life. Such sealing elements have not been usable in prior art valves because the wall thickness of the poppet in this region has been insufficient.

DETAILED DESCRIPTION

Figure 1:
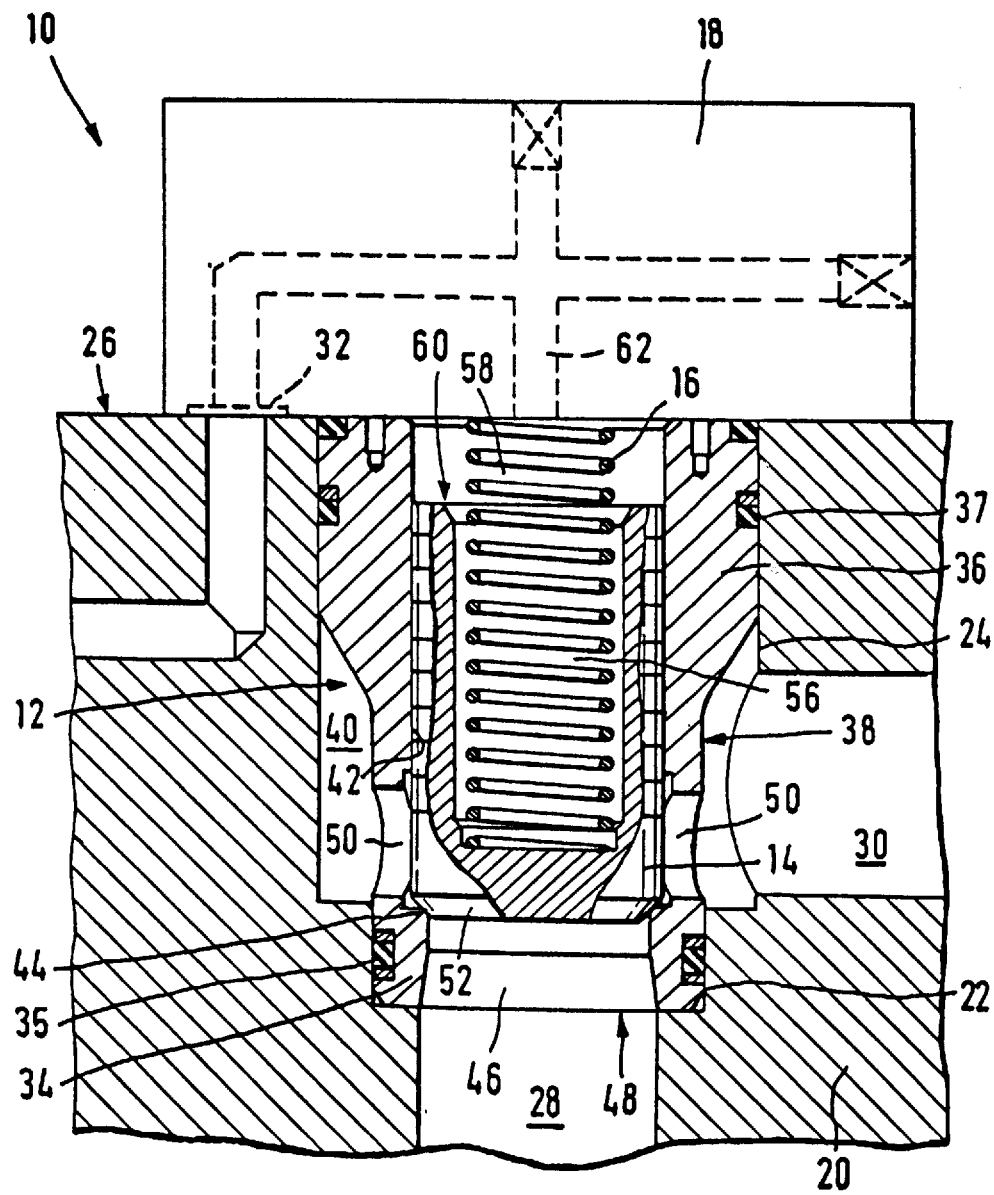
FIGS. 1 and 2 are cross-sectional views of two embodiments of prior art two-port cartridge type seat valves.

Referring first to FIG. 1, the typical construction of a two-port cartridge type seat valve 10 according to the prior art is described. The valve 10 includes a valve sleeve 12, a poppet 14, a closure spring 16 and a valve cover 18. The valve sleeve 12 is installed in a manifold 20 which has for that purpose a stepped bore having a first bore step 22 and a second bore step 24. The second bore step 24, which has its mouth in a connection surface 26 of the manifold 20, is larger in diameter than is the first bore step 22.

A first main flow channel 28 for a hydraulic fluid in the manifold 20 opens coaxially into the first bore step 22. A second main flow channel 30 in the manifold 20 opens laterally into the second bore step 24.

The valve cover 18 is attached to the connection surface 26, for example by fastening screws (not shown), and can have one or more pilot oil connections 32.

To ensure the interchangeability of these multi-use two-port valves, the diameters and depths of the two bore steps 22 and 24, the dimensions and position of the valve cover 18 and the position of its fastening screws, the position of the pilot oil connections 32 in the valve cover 18, and the position of the lateral second main flow channel 30 are standardized as a function of the nominal size of the valve (in Germany for example in DIN 24342).

Because the diameters and depths of the two bore steps 22 and 24 and the position of the lateral second main flow channel 30 in the manifold 20 are standardized, the outer form of the valve sleeve 12 is largely fixed and cannot be altered further. The valve sleeve 12 must therefore have at its first end a first cross-sectional portion 34 that corresponds in diameter to the first bore step 22 and accordingly can be fitted, sealed axially by one or more first sealing elements 35, into the first bore step 22. It must also have a second cross-sectional portion 36 that corresponds to the diameter of the second bore step 24 and accordingly can be fitted, sealed axially by one or more second sealing elements 37, into the second bore step 24. The first and second cross-sectional portions 34 and 36 of the valve sleeve 12 are connected by a central cross-sectional portion 38. That region is so designed that within the second bore step 24 it defines an annular chamber 40 surrounding the valve sleeve. This annular chamber 40 is accordingly limited axially at one end by the first outer cross-sectional portion 34 fitted in the first bore step 22, and at the other end by the second outer cross-sectional portion 36 fitted in the second bore step 24.

The prior art valve sleeve 12 has an axial guide bore 42 which extends from the second end of the valve sleeve 12 as far as a valve seat 44. In that guide bore 42 of the valve sleeve 12 the cylindrical poppet 14 is fitted so as to be axially displaceable therein between the valve seat 44 and the valve cover 18. Directly below the seating surface 44 the valve sleeve 12 has an axial main channel 46 which forms an axial first main port 48 at the end-face of the first end of the valve sleeve. In its central cross-sectional portion 38, above the valve seat 44, the valve sleeve 12 has several lateral second main ports 50 for connecting the main channel 46 with the annular chamber 40.

The cylindrical poppet 14 has at its first end a closure cone 52 associated with the valve seat 44. The closure spring 16 exerts on the poppet 14 a closing force urging the poppet towards the valve seat 44. The closure spring 16 is inserted in an inner axial spring chamber 56 in the poppet 14 and is supported by its free end on the valve cover 18. A pilot oil chamber 58 is defined axially within the guide bore 42 by the second end of the poppet 14. Consequently, the poppet 14 has a pilot pressure area 60 which corresponds to the cross-section of the guide bore 42. The pilot oil chamber 58 is connected to the pilot oil connection 32 via a pilot oil bore 62 in the valve cover 18.

In the valve shown to FIG. 1, the free cross-sections of the valve seat 44 and of the axial main channel 46 correspond approximately to the pilot area 60 of the poppet 14 in the pilot chamber 58. This geometry is, for example, typical for the use of the two-port valve as a pressure-control valve. The pressure loss of the hydraulic fluid in the valve is minimized by making the cross-sectional area of the valve seat 44 as large as possible.

Figure 2:
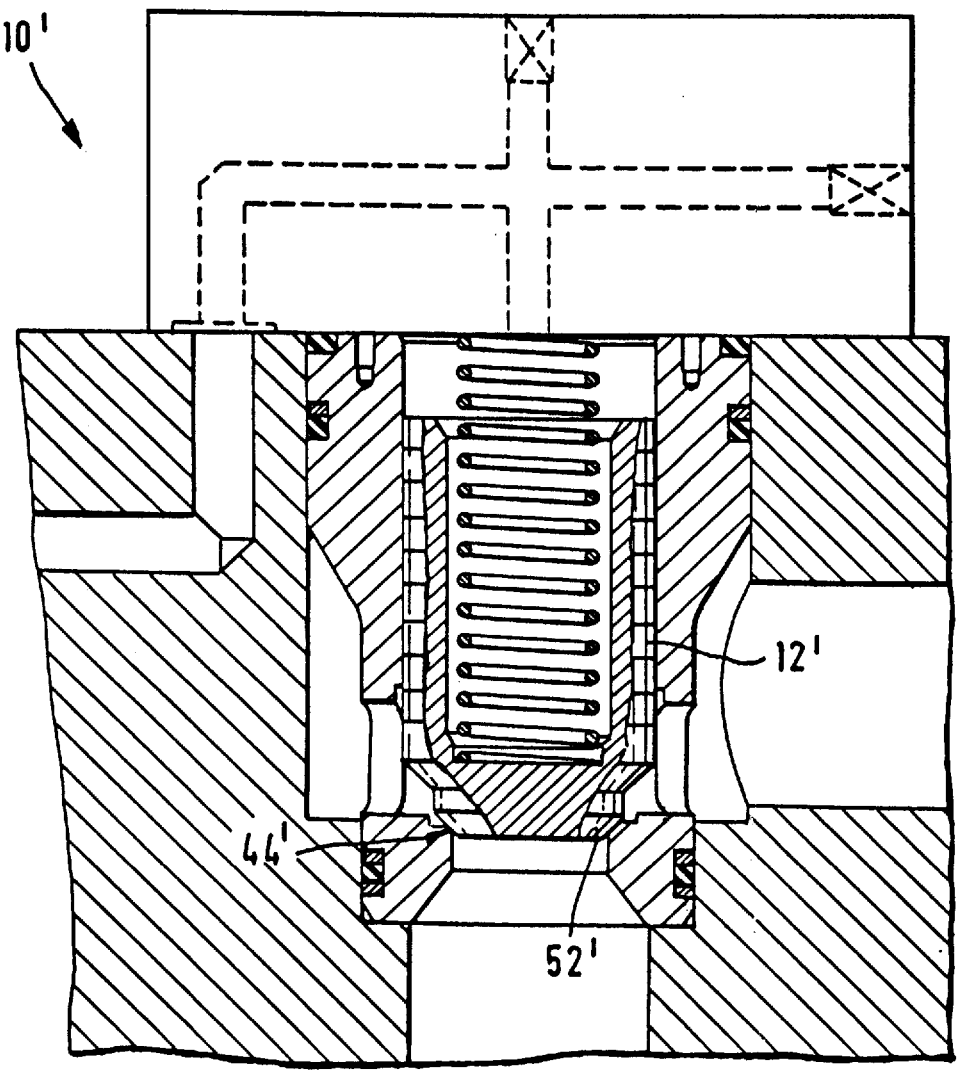

If, however, the two-port valve 10 shown in FIG. 1 is used as a pilot-controlled two/two-port directional valve for switching functions, the large cross-section of the closure cone 52, corresponding to the large free cross-section of the valve seat 44, has an adverse effect on the behavior of the valve. Accordingly, for switching functions a valve is used such as that shown in FIG. 2. That valve 10' differs from the valve 10 according to FIG. 1 solely in that the free cross-sectional area of the valve seat 44' has been reduced by about 40% and the closure cone 52' of the poppet 12' has been adapted accordingly. This reduction in the free cross-section of the valve seat 44' improves the closure behavior of the valve when it is used as a two/two-port directional valve for switching functions.

Figure 3:
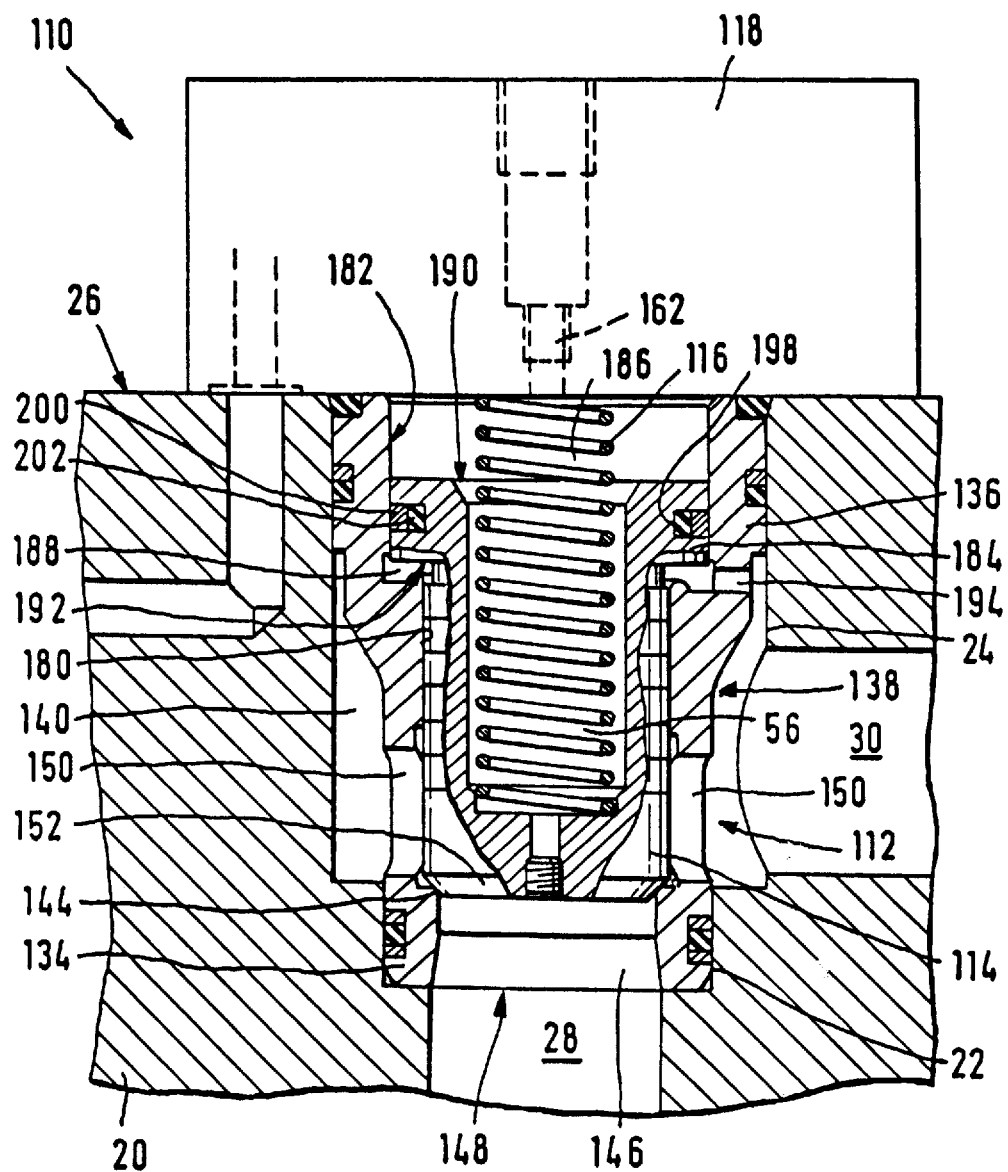
FIG. 3 is a cross-sectional view of a first embodiment of the two-port cartridge valve according to the invention.

A first embodiment of a valve according to the principles of the invention is shown in FIG. 3, which illustrates two-port valve 110. This two-port valve 110 is inserted in the same manifold 20 as illustrated in FIG. 1, which accordingly is not described in detail here. As with the two-port valve 10 of FIG. 1, the valve 110 has a valve sleeve 112, a poppet 114, a closure spring 116 and a valve cover 118. The valve sleeve 112 has a first cross-sectional portion 134, a second cross-sectional portion 136 and a central cross-sectional portion 138, which correspond in structure and function to the corresponding portions 34, 36 and 38, respectively, of the valve sleeve 12 and are therefore not described in detail. As in FIG. 1, an annular chamber 140 is formed between the central cross-sectional portion 138 and the second bore step 24 of the manifold 20. An axial first main port 148 is located at the end-face of the first end of the valve sleeve 110.

Lateral main ports 150 are arranged around the circumference in the central cross-sectional portion 138 of the valve sleeve 110 to make with the annular chamber 140 a connection having a free cross-sectional area that is as large as possible. Within the valve sleeve 110, the first axial main port 148 is extended by an axial main channel 146. A valve seat 144 is located in the main channel 146 between the axial first main port 148 and the lateral second main ports 150.

A first guide bore 180 for the poppet 114 extends in the central cross-sectional portion 138 from the valve seat 144 towards the second end of the valve sleeve 112. The lateral second main ports 150 open into that first guide bore 180, and a first cylindrical end of the poppet 114 is fitted therein for axial displacement. The first end of the poppet 114 has on its end-face a closure cone 152 which is matched to the valve seat 144.

The lower part of the valve sleeve 12 and the poppet 114 are designed to minimize pressure losses in the main flow through the open valve 110. Those pressure losses depend, on the one hand, on the free cross-section of the annular chamber 140, especially in the region of the lateral second main ports 150, and, on the other hand, on the free cross-section of the valve seat 144 or of the main channel 146. To reduce the pressure loss in the annular chamber 140, the outer diameter of the valve sleeve 114 in the region of the lateral second main ports 150 is approximately equal to the diameter of the first bore step 22. In that region the free annular cross-section of the annular chamber 140 is accordingly equal to the difference between the cross-sectional areas of the first and second bore steps 22 and 24. The minimum necessary wall thickness of the valve sleeve 112 in that region of the first guide bore 180 dictates the maximum possible cross-section of the poppet 114 or of the closure cone 152 and accordingly the maximum free cross-sectional area of the valve seat 144.

A fundamental difference between the known valve design shown in FIG. 1 and the valve design shown in FIG. 3 is that the valve sleeve 112 has for the poppet 114 a stepped inner guide bore matched to the stepped cross-sectional portions 134, 136 and 138. A second guide bore 182 extends substantially within the second cross-sectional portion 136 of the valve sleeve and has a larger cross-sectional area than does the first guide bore 180. In the design according to FIG. 3 that second guide bore 182 can have, for example, a cross-section that is about 60% to 100% larger than the first guide bore 180. The maximum cross-sectional area is determined by the minimum wall thickness of the valve sleeve 112 in its second cross-sectional portion 136.

At one end the second guide bore 182 is axially defined and sealed by the valve cover 118 and at the other end sealing is effected by the first cylindrical end of the poppet 114 in the first guide bore 180. At its second end the poppet 114 has a piston flange 184. That piston flange 184 is fitted for axial displacement in the second guide bore 182 and divides the latter axially into an end-face first pilot chamber and an annular second pilot chamber 186 and 188. It therefore has at the endface a first pilot pressure area 190, the area of which corresponds to the cross-sectional area of the second guide bore 182, and which is thus about 60% to 100% larger than the opposing end-face of the poppet 114. A second annular, and oppositely acting, pilot pressure area 192 is formed by the piston flange 184 in the second pilot chamber 188. The area of the second, annular pilot area 192 corresponds to the difference between the cross-sectional areas of the first and second guide bores 180 and 182. The second pilot chamber 188 the annular chamber 140 by way of a first connection channel 194 through the wall of the valve sleeve 112.

The valve 110 according to FIG. 3 can be used as a pilotcontrolled two/two-port directional valve for switching functions. The first pilot chamber 186 is acted upon by the pilot pressure px supplied by pilot oil bore 162. When the valve 110 is in the closed position, the annular second pilot chamber 188 is charged via the first connection bore 194 with the pressure p, of the second main flow channel 30. When the cross-sectional area of the second guide bore 182 is larger by about 60% to 100% than that of the first guide bore 180, the hydrostatic closing force acting on the poppet, at the same pilot pressure $P_X$, is greater than the hydrostatic closing force in the valve of FIG. 1. If the second main flow channel 30 is, for example, depressurized, the hydrostatic closing force acting on the poppet, at the same pilot pressure $P_X$ is from 1.6 to 2.0 times greater than the hydrostatic closing force in the valve of FIG. 1. However, to produce in the closed position the same hydrostatic closing force, at the same pilot pressure $P_X$ in a prior art valve according to FIG. 2, it would be necessary to accept a pressure loss at least 40% higher when the valve 10' is open as a consequence of the smaller free cross-sectional area of the valve seat 44'.

The first connection channel 194 is preferably a bore formed so that a throttle 196 can be inserted (for example screwed into an internal thread in the bore). The flow in the first connection channel 194 is restricted by the throttle, thus slowing the opening and closing movements of the poppet 114. In contrast, in the prior art valves of FIGS. 1 or 2, the opening and closing movements of the poppet 14 or 14' cannot be so controlled—a throttle can be installed only in the pilot bore 62 in the cover 18. Consequently, the movements of the poppet 14, 14' can only be slowed to a limited extent, since in practice a minimum throttle bore is prescribed to prevent clogging with solid particles. In the valves according to FIGS. 3 and 4, however, the action of a throttle in the pilot bore 162 is supplemented by the action of the throttle in the first connection channel 194.

As in the valve shown in FIG. 1, the poppet 114 in FIG. 3 has an axial spring chamber 156 that accommodates the closure spring 116, which is supported at its second end on the valve cover 118. A further advantage of the valve according to FIG. 3 is a result of the increased wall thickness of the poppet 114 to the inner spring chamber 156 in the region of the piston flange 184. In that increased wall thickness it is possible to provide at least one, relatively deep annular groove 198 without compromising the structural integrity of poppet about the inner spring chamber 156. The annular groove can therefore accommodate proven sealing elements which require a relatively deep installation depth, such as a sealing ring combination consisting of an inner O-ring 202 and an outer sliding ring 200 that protects the O-ring 202. In the case of the prior art valve according to FIGS. 1 or 2, it is only possible, because of the small wall thickness, to install a simple O-ring in a shallow annular groove. That solution has not proved successful because the dynamic loads exerted on the poppet 14, 14', unacceptably shorten the service life of the unprotected O-ring.

Figure 4:
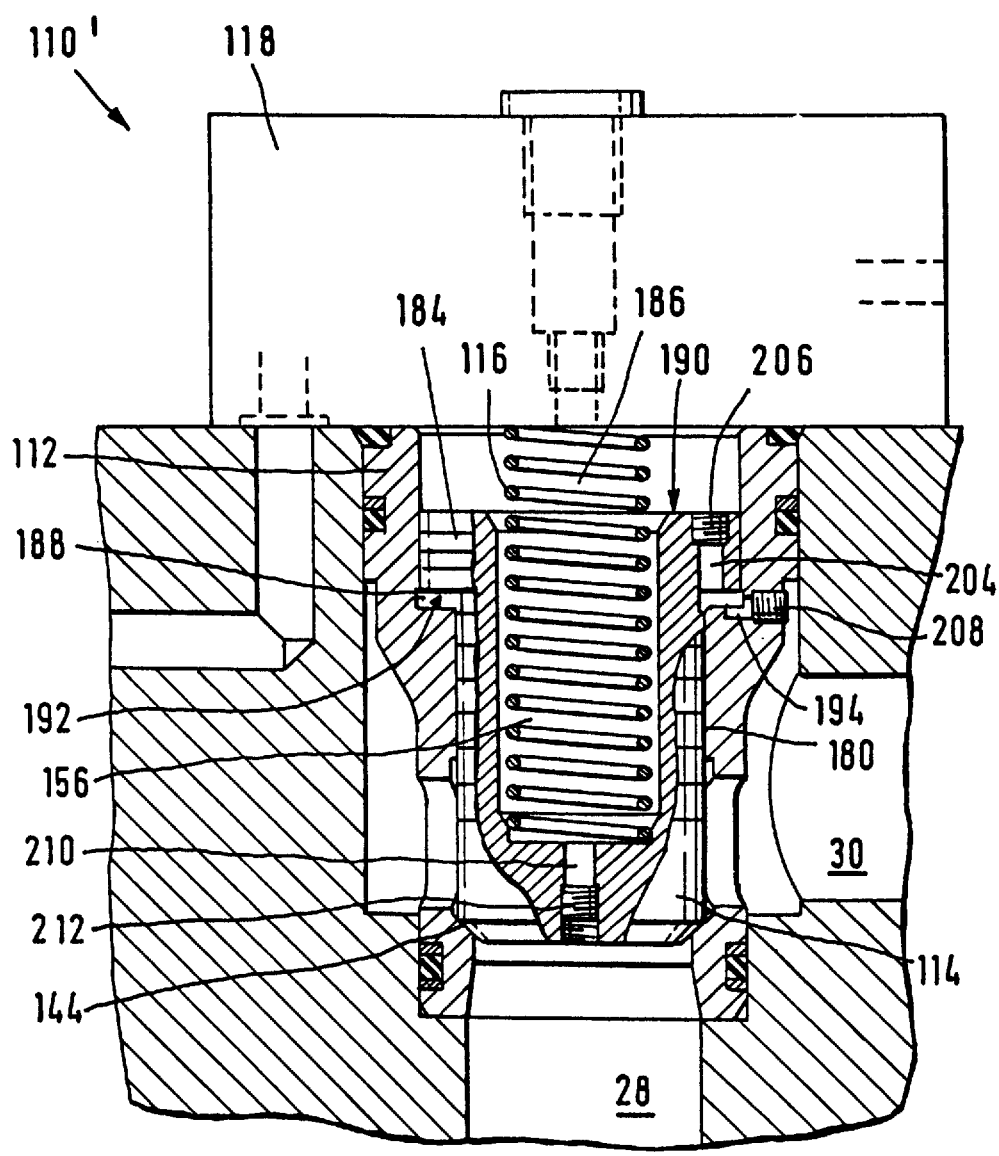
FIG. 4 is a cross-sectional view of a second embodiment of the two-port cartridge valve according to the invention.

If the valve according to the invention is to be used both as a pilot-controlled two/two-port directional valve and as a pressure-control valve, it is preferred to use the valve design shown in FIG. 4. That design differs from the design shown in FIG. 3 by the addition of a second connection channel 204 which extends through the piston flange 184 between the first and second pilot areas 190 and 192. The second connection channel 204 can be closed by a plug, for example a screw-in plug 206. With this screw-in plug 206 installed in the second connection channel 204, the valve of FIG. 4 operates the same as the valve of FIG. 3 and can be used as a directional valve.

If, however, the screw-in plug 206 is omitted from the second connection channel 204, and the first connection channel 194 is closed by a plug, for example a screw-in plug 208, the net pilot area of the valve 110' acting in the closure direction is approximately equal to the free cross-section of the valve seat 144. The second pilot chamber 188 is then connected with the first pilot chamber 186 and the annular second pilot area 192 can be subtracted from the end-face first pilot area 190 so that the remaining, effective pilot area corresponds to the cross-section of the first guide bore 180. The valve therefore has the equality of area between the free cross-section of the valve seat 144 and the effective pilot area that is desirable for many pilot-controlled pressure-control valve functions.

In addition, a damping throttle can then be inserted into the second connection bore 204 for damping the movements of the poppet and for avoiding oscillations when the valve responds. The installation of a damping throttle in the pilot oil connection of the valve cover 118 does not achieve the desired result in many applications.

By using a valve cover without a pilot oil connection (not shown) the valve 110' of FIG. 4 can be used as a check valve, for example as a non-return valve. If the first and second connection bores 194 and 204 are not closed by a plug, the valve forms a non-return valve having free flow from the first main flow channel 28 to the second main flow channel 30, while in the opposite direction the flow is blocked by the closure spring 116 and the hydrostatic pressure in the first pilot chamber 186.

If a third connection channel 210 is provided in the poppet 114 in the end-face of its first end, the flow direction of the valve according to FIG. 4 can easily be reversed. As can be seen in FIG. 4, that third connection channel 210 extends between the spring chamber 156 and the first end-face of the poppet 114 and thus connects the first main flow channel 28 with the first pilot chamber 186 when the valve is closed. The first and third connection channels 194 and 210 are opened, the second connection channel 204 is closed by the screw-in plug 206. If the pressure in the first main flow channel 28 is higher than that in the second main flow channel 30, that higher pressure blocks the valve via the first pilot area 190 in conjunction with the closure spring 116. If the pressure in the first main flow channel 28 falls significantly below the pressure in the second main flow channel 30, the pressure in the second main flow channel 30 opens the valve via the annular second pilot area 192, allowing free flow of the hydraulic fluid from the second main flow channel 30 to the first main flow channel 28. The third connection channel 210 is also closable by a plug (for example a screw-in plug 212).

Thus, the valve shown in FIG. 4 can be used for an extremely wide variety of applications without the need for substantial alteration work and can be adapted advantageously to different valve functions.

What is claimed is:

1. A two-port cartridge type seat valve for use in hydraulic manifold having a stepped bore closed at one end by a valve cover having a pilot bore communicating with a source of fluid at a pilot pressure, a first main flow channel communicating with a source of fluid at a first pressure, a second main flow channel communicating with a source of fluid at a second pressure, a first bore step of the stepped bore being coupled to the first main flow channel and a second bore step, of larger diameter than the first bore step, being coupled to the second main flow channel, said valve to be disposed in the stepped bore between the valve cover and the first main flow channel, said valve comprising:

a monolithic valve sleeve insertable into the stepped bore and having:

a first and second end, a first cross-sectional portion at said first end, for axially sealed fitting into the first bore step, a second cross-sectional portion for axially sealed fitting into the second bore step, a central cross-sectional portion between said first and second cross-sectional portions and defining an annular chamber within said second bore step, the second main flow channel communicating with said annular chamber when said valve sleeve is inserted into the stepped bore, an axial main flow bore forming a first main port in said first end of said valve sleeve, a lateral second main port in said central cross-sectional portion coupling said main flow bore to said annular chamber, a valve seat disposed in said main flow bore between said first and second main ports, a stepped guide bore having a first guide bore step extending in said central cross-sectional portion from said valve seat towards said second end of said valve sleeve and a second guide bore step extending substantially within said second cross-sectional portion and having a cross-sectional are larger than that of said first guide bore step, a poppet having a first and a second end and being fitted into said guide bore for axial displacement therein, said poppet having at its first end a piston flange dividing said second guide bore step axially into an end-face first pilot chamber and an annular second pilot chamber, said first pilot chamber communicating with the pilot bore;

a closure spring coupled to said poppet and disposed between said poppet and the valve cover to urge said poppet towards said valve seat, a first connection channel disposed in said valve sleeve and fludically coupling said annular second pilot chamber with said annular chamber, and said valve seat and said axial main flow bore having cross-sectional areas corresponding approximately to the cross-sectional area of said first guide bore step, whereby when said closure cone is seated on said valve seat, said first pressure is communicated to said first main port and thence applied to said closure cone, said second pressure is communicated to said annular chamber, and said pilot pressure is communicated to said second guide bore step and thence applied to said first pilot chamber, said poppet being displaced away from said valve seat when said first pressure is greater than said second pressure by a predetermined amount, establishing fluidic communication between said first and second main ports, said valve being operable as a directional valve when said second pressure is communicated via said first connection channel to said second pilot chamber.

2. The valve of claim 1 further comprising:
an internal, axial spring chamber formed in said poppet;
an annular groove formed in the outer periphery of said piston flange; and
a sealing element received in said annular groove.

3. The valve of claim 2 wherein said sealing element comprises an inner O-ring and an outer sliding ring.

4. A two-port cartridge type seat valve for use in a hydraulic manifold having a stepped bore closed at one end by a valve cover having a pilot bore communicating with a source of pilot pressure, a first main flow channel, a second main flow channel, a first bore step of the stepped bore being coupled to the first main flow channel and a second bore step, of larger diameter than the first bore step, being coupled to the second main flow channel, said valve to be disposed in the stepped bore between the valve cover and the first main flow channel, said valve comprising:

a monolithic valve sleeve insertable into the stepped bore and having:
a first and second end,
a first cross-sectional portion at said first end, for axially sealed fitting into the first bore step,
a second cross-sectional portion for axially sealed fitting into the second bore step,
a central cross-sectional portion between said first and second cross-sectional portions and defining an annular chamber within said second bore step, the second main flow channel communicating with said annular chamber when said valve sleeve is inserted into the stepped bore, an axial main flow bore forming a first main port in said first end of said valve sleeve,
a lateral second main port in said central cross-sectional portion coupling said main flow bore to said annular chamber,
a stepped guide bore having a first guide bore step extending in said central cross-sectional portion from said valve seat towards said second end of said valve sleeve and a second guide bore step extending substantially within said second cross-sectional portion and having a cross-sectional area larger than that of said first guide bore step,
a poppet having a first and a second end and being fitting into said guide bore for axial displacement therein, said poppet having at its first end a closure cone associated with said valve seat and at its second end a piston flange dividing said second guide bore step axially into an end-face first pilot chamber and an annular second pilot chamber, said first pilot chamber communicating with the pilot bore, said piston flange having a second connection channel therethrough coupling said first and second pilot chambers,
a closure spring coupled to said poppet and disposed between said poppet and the valve cover to urge said poppet towards said valve seat; and
throttle means associated with said second connection channel for damping the movements of the poppet, said valve seat and said axial main flow bore having cross-sectional
areas corresponding approximately to the cross-sectional area of said first guide bore step.

5. A two-port cartridge type seat valve for use in a hydraulic manifold having a stepped bore closed at one end by a valve cover, a first main flow channel communicating with a source of fluid at a first pressure, a second main flow channel communicating with a source of fluid at a second pressure, a first bore step of the stepped bore being coupled to the first main flow channel and a second bore step, of larger diameter than the first bore step, being coupled to the second main flow channel, said valve to be disposed in the stepped bore between the valve cover and the first main flow channel, said valve comprising:

a valve sleeve insertable into the stepped bore and having:
a first and second end,
a first cross-sectional portion at said first end, for axially sealed fitting into the first bore step,
a second cross-sectional portion for axially sealed fitting into the second bore step,
a central cross-sectional portion between said first and second cross-sectional portions and defining an annular chamber within said second bore step, the second main flow channel communicating with said annular chamber when said valve sleeve is inserted into the stepped bore,
an axial main flow bore forming a first main port in said first end of said valve sleeve,
a lateral second main port in said central cross-sectional portion coupling said main flow bore to said annular chamber,
a valve seat disposed in said main flow bore between said first and second main ports,
a stepped guide bore having a first guide bore step extending in said central cross-sectional portion from said valve seat towards said second end of said valve sleeve and a second guide bore step extending substantially within said second cross-sectional portion and having a cross-sectional area larger than that of said first guide bore step, a poppet having a first and a second end and being fitted into said guide bore for axial displacement therein, said poppet having at its first end a closure cone associated with said valve seat and at its second end a piston flange dividing said second guide bore step axially into an end-face first pilot chamber and an annular second pilot chamber, a closure spring coupled to said poppet and disposed between said poppet and the valve cover to urge said poppet towards said valve seat;

said valve sleeve having a first connection channel therethrough coupling said annular second pilot chamber with said annular chamber;

said piston flange having a second connection channel therethrough coupling said first and second pilot chambers;

said first end of said poppet having a third connecting channel extending therethrough coupling said first main flow bore to said end-face first pilot chamber;

a first plug selectively disposable in said second connection channel to fluidically isolate said first pilot chamber from said second pilot chamber; and a second plug selectively disposable in said third connection channel to fluidically isolate said first main flow bore from said end-face first pilot chamber, said valve seat and said axial main flow bore having cross-sectional areas corresponding approximately to the cross-sectional area of said first guide bore step, whereby when said closure cone is seated on said valve seat, said first pressure is communicated to said first main port and thence applied to said closure cone, said second pressure is communicated to said annular chamber, and said pilot pressure is communicated to said second guide bore step and thence applied to said first pilot chamber, said poppet being displaceable away from said valve seat to establish fluidic communication between said first and second main ports, said valve being operable in a first, non-return valve mode when said first plug is not disposed in said second connection channel and said second plug is disposed in said third connection channel, so that said second pressure is communicated via said first connection channel to said second pilot chamber and via said second connection channel to said end-face first pilot chamber, said poppet being displaced away from said valve seat to establish fluidic communication between said first and second main ports when said first pressure exceeds said second pressure by a predetermined amount, said valve further being operable in a second, reverse non-return valve mode when said first plug is disposed in said second connection channel and said second plug is not disposed in said third connection channel, so that said second pressure is communicated via said first connection channel to said second pilot chamber and said first pressure is communicated via said third connection channel to said end-face first pilot chamber, said poppet being displaced away from said valve seat to establish fluidic communication between said first and second main ports when said second pressure exceeds said first pressure by a predetermined amount.

6. The valve of claim 5 further comprising a throttle selectively disposable in said first connection channel, whereby the rate of displacement of said poppet is reduced when said throttle is disposed in said first connection channel.

7. The valve of claim 5 further comprising a throttle selectively disposable in said second connection channel, whereby the rate of displacement of said poppet is reduced when said first plug is not disposed in said second connection channel and said throttle is disposed in said second connection channel.

8. The valve of claim 5 further comprising:
   an internal, axial spring chamber formed in said poppet;
   an annular groove formed in the outer periphery of said piston flange; and
   a sealing element received in said annular groove.

9. The valve of claim 8 wherein said sealing element comprises an inner O-ring and an outer sliding ring.

10. A two-port cartridge type seat valve for use in a hydraulic manifold having a stepped bore closed at one end by a valve cover having a pilot bore communicating with a source of fluid at a pilot pressure, a first main flow channel communicating with a source of fluid at a first pressure, a second main flow channel communicating with a source of fluid at a second pressure, a first bore step of the stepped bore being coupled to the first main flow channel and a second bore step, of larger diameter than the first bore step, being coupled to the second main flow channel, said valve to be disposed in the stepped bore between the valve cover and the first main flow channel, said valve comprising:
   a valve sleeve insertable into the stepped bore and having:
   a first and second end,
   a first cross-sectional portion at said first end, for axially sealed fitting into the first bore step,
   a second cross-sectional portion for axially sealed fitting into the second bore step,
   a central cross-sectional portion between said first and second cross-sectional portions and defining an annular chamber within said second bore step, the second main flow channel communicating with said annular chamber when said valve sleeve is inserted into the stepped bore,
   an axial main flow bore forming a first main port in said first end of said valve sleeve,
   a lateral second main port in said central cross-sectional portion coupling said main flow bore to said annular chamber,
   a valve seat disposed in said main flow bore between said first and second main ports,
   a stepped guide bore having a first guide bore step extending in said central cross-sectional portion from said valve seat towards said second end of said valve sleeve and a second guide bore step extending substantially within said second cross-sectional portion and having a cross-sectional area larger than that of said first guide bore step,
   a poppet having a first and a second end and being fitted into said guide bore for axial displacement therein, said poppet having at its first end a closure cone associated with said valve seat and at its second end a piston flange dividing said second guide bore step axially into an end-face first pilot chamber and an annular second pilot chamber, said first pilot chamber communicating with the pilot bore, said piston flange having a second connection channel therethrough fluidically coupling said first and second pilot chambers;
   a closure spring coupled to said poppet and disposed between said poppet and the valve cover to urge said poppet towards said valve seat; a first connection channel disposed in said valve sleeve and fluidically coupling said annular second pilot chamber with said annular chamber;

a first plug selectively disposable in said first connection channel to fluidically isolate said annular second pilot chamber from said annular chamber; and a second plug selectively disposable in said second connection channel to fluidically isolate said first pilot chamber from said second pilot chamber, said valve seat and said axial main flow bore having cross-sectional areas corresponding approximately to the cross-sectional area of said first guide bore step, whereby when said closure cone is seated on said valve seat, said first pressure is communicated to said first main port and thence applied to said closure cone, said second pressure is communicated to said annular chamber, and said pilot pressure is communicated to said second guide bore step and thence applied to said first pilot chamber, said poppet being displaced away from said valve seat when said first pressure is greater than said second pressure by a predetermined amount, establishing fluidic communication between said first and second main ports, said valve being operable in a first, directional valve mode when said first plug is not disposed in said first connection channel and said second plug is disposed in said second connection channel, so that said second pressure is communicated via said first connection channel to said second pilot chamber, said valve further being operable in a second, pressure control valve mode when said first plug is disposed in said first connection channel and said second plug is not disposed in said second connection channel, so that said first pressure is communicated via said second connection channel to said second pilot chamber.

11. The valve of claim 10 further comprising a first throttle selectively disposable in said first connection channel, whereby the rate of displacement of said poppet is reduced.

12. The valve of claim 10 further comprising a second throttle selectively disposable in said second connection channel, whereby the rate of displacement of said poppet is reduced when said second plug is not disposed in said first connection channel and said second throttle is disposed in said second connection channel.

13. The valve of claim 10 wherein said first and second plugs have an external thread and said first and second connection channels have an internal thread for receiving said threaded plugs.

14. The valve of claim 10 further comprising:

an internal, axial spring chamber formed in said poppet;

an annular groove formed in the outer periphery of said piston flange; and a sealing element received in said annular groove.

15. The valve of claim 14 wherein said sealing element comprises an inner O-ring and an outer sliding ring.

* * * * *